United States Patent [19]

Kalwara

[11] Patent Number: 5,514,299

[45] Date of Patent: May 7, 1996

[54] STATIC DISSIPATIVE CONTAINER LINER AND METHOD OF MAKING SAME

[75] Inventor: Joseph J. Kalwara, Indianapolis, Ind.

[73] Assignee: Bridgestone/Firestone, Inc., Akron, Ohio

[21] Appl. No.: 272,468

[22] Filed: Jul. 11, 1994

[51] Int. Cl.⁶ .............................. H01B 1/24; B65D 25/16; B65D 90/46; C08K 3/04
[52] U.S. Cl. .................. 252/511; 252/502; 252/510; 264/105; 428/35.7; 428/36.9; 428/36.92; 220/88.1; 220/404; 220/410; 220/470; 220/400
[58] Field of Search .................... 220/88.1, 17.1, 220/402, 403, 404, 410, 470, 400; 252/502, 510, 511; 264/105; 428/35.7, 36.9, 36.92

[56] References Cited

U.S. PATENT DOCUMENTS

| | | | |
|---|---|---|---|
| 2,426,820 | 9/1947 | Evans et al. | 220/453 |
| 3,104,985 | 9/1963 | Williams et al. | 252/511 X |
| 3,327,884 | 6/1967 | Ent et al. | 220/469 X |
| 3,673,121 | 6/1972 | Meyer | 252/511 |
| 4,124,747 | 11/1978 | Murer et al. | 252/511 X |
| 4,151,126 | 4/1979 | Adelman et al. | 252/511 X |
| 4,347,948 | 9/1982 | Hamada et al. | 220/404 |
| 4,421,678 | 12/1983 | Mehta | 252/511 |
| 4,567,097 | 1/1986 | Yazaki et al. | 428/317.7 |
| 4,597,504 | 7/1986 | Witt | 220/88.1 |
| 4,696,765 | 9/1987 | Kakizaki et al. | 252/511 |
| 4,746,574 | 5/1988 | Hattori et al. | 428/409 |
| 4,871,613 | 10/1989 | Akao | 428/328 |
| 4,971,726 | 11/1990 | Maeno et al. | 252/511 |
| 5,124,075 | 6/1992 | Yasuda et al. | 252/511 |
| 5,174,924 | 12/1992 | Yamada et al. | 252/511 X |
| 5,213,736 | 5/1993 | Sumita et al. | 252/500 X |

FOREIGN PATENT DOCUMENTS

| | | |
|---|---|---|
| 257698 | 3/1988 | European Pat. Off. . |
| 59-221342 | 12/1984 | Japan . |
| 62-251374 | 11/1987 | Japan . |
| 5-156100 | 6/1993 | Japan . |

OTHER PUBLICATIONS

"Standard Test Methods for D–C Resistance or Conductance of Insulating Materials", *American Society for Testing and Materials*, D 257–78 (Reapproved 1983 and Revised Jul. 1983), pp. 74–89.

"Electrostatic Properties of Materials", *Fed. Test Method Std.*, No. 101C, Method 4046 (Mar. 13, 1980), Sections 1–8.

*Condensed Chemical Dictionary*, Turner, Francis M., ed., 4th ed. (1950), Reinhold Publishing Corporation, p. 9.

Polymat annotation No. 5391, "Finathene 5300", *Datenblatt Finathene*, 1987.

*Primary Examiner*—Douglas J. McGinty
*Attorney, Agent, or Firm*—Frank J. Troy, Sr.

[57] ABSTRACT

A chemical resistant static dissipative container liner for facilitating reuse of a metal container by providing a barrier between the metal container and a flammable liquid contained therein is comprised of a suitable polymeric composition having distributed therein an amount of conductive carbon black which is sufficient to imbue the composition with a surface resistivity of from about $1.5 \times 10^4$ to about $1.3 \times 10^8$ ohms/square.

10 Claims, 1 Drawing Sheet

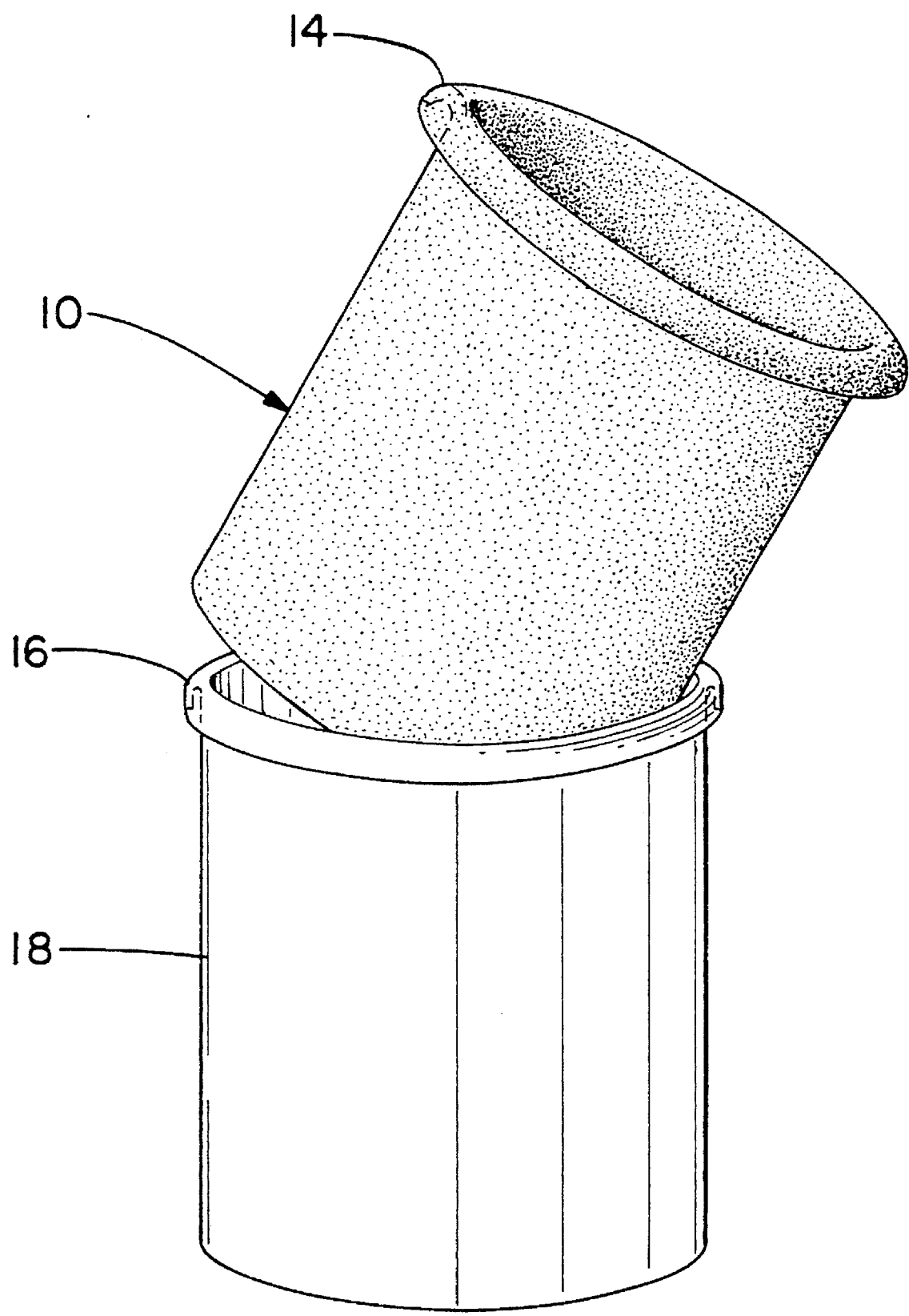

STATIC DISSIPATIVE CONTAINER LINER AND METHOD OF MAKING SAME

FIELD OF THE INVENTION

The invention relates to a container liner for protecting a reusable or recyclable rigid metal container from contamination or exposure to a flammable liquid which is being contained therein. More particularly, the invention is directed toward providing a static dissipative container liner which will serve as an effective barrier for preventing a liquid which is being held within a metal container from contacting the walls thereof, and which has suitable static dissipative properties to reduce or eliminate the risk of electrostatic discharges which could ignite flammable vapors and/or liquid contacting the container liner.

BACKGROUND OF THE INVENTION

Various liquid or semi-liquid compositions, such as coating and adhesive compositions frequently contain flammable components which can cause such compositions to undergo combustion if exposed to a source of ignition such as an electrostatic discharge. Because of various federal and provincial regulations relating to the transportation of flammable materials, flammable liquids are generally transported and stored in steel or other rigid metal containers. These metal containers are generally durable and are readily reusable or recyclable provided that they have not been chemically attacked, soiled or encrusted by the liquid or semi-liquid material contained therein. Because of their durability, and also because of the relatively high costs associated with the fabrication and disposal of suitable metal containers for transporting and storing flammable liquid or semi-liquid compositions, it is highly desirable to reuse such containers. Generally, however, it is not safe, practical and cost effective to reuse metal containers which have been in direct contact with materials which either cause corrosion or otherwise chemically attack the walls of the metal container, or which soil, contaminate or otherwise form a tenacious union with the walls of the container. Metal containers which have been corroded or otherwise chemically attacked can lose both structural and functional utility, thereby creating the risk of a potentially hazardous spill or leak. Reuse of such containers would entail careful and costly inspection, and repair, or both, and would not completely eliminate the risks associated with the reuse of chemically attacked containers. Reuse of soiled containers such as those having solids encrusted on the walls thereof would generally be impractical because of the expense associated with cleaning and reconditioning such containers.

In order to facilitate reuse of metal containers for shipping and storing flammable liquid or semi-liquid materials, problems caused by direct contact of the liquid or semi-liquid material with the walls of the metal container have been effectively eliminated by using plastic inserts or liners which are impermeable to the materials contained therein. However, a very serious problem arises when plastic liners are used for storing flammable materials. This problem relates to the tendency of most plastics to easily acquire an electrostatic charge. An electrostatic charge can be easily generated on the surface of most plastics by creating friction between the plastic and another material. Once a plastic liner has acquired an electrostatic charge, an abrupt electrical discharge or spark can occur between the surface of the plastic liner and an object in close proximity which has a different electrical potential. The electrical spark in turn can ignite flammable vapors and/or liquids nearby resulting in a fire hazard. Because the liner is disposable, whereas the metal pail is typically recyclable, it is common to remove the liner from the pail immediately after the contents of the liner has been used. Removal of a non-static dissipative plastic liner from a metal pail can easily create electrical sparks, especially if the relative humidity is low. Such electrical spark can, especially in poorly ventilated areas, ignite volatile flammable components emanating from residual material left on the walls of the liner. Accordingly, such liners must generally meet certain static dissipative criteria. For example, the National Fire Protection Association (NFPA) specifies that such liners be static dissipative as determined by ASTM D-257 "Surface Resistivities" procedure and by the Static Decay Test described in Federal Test Method Standard 101C, Method 4046, "Electrostatic Properties of Materials" Specifically, the plastic container liners should have a surface resistivity of between $10^5$ and $10^{11}$ ohms/square, and should have a static decay of less than 0.5 seconds @ 10% cutoff for static decay.

Prior attempts to provide plastic container liners for preventing contact between a metal container and a flammable liquid or semi-liquid composition contained therein, and which exhibit the desired or mandatory static dissipative properties have been directed toward the use of any of various conventional antistatic agents, such as quaternary ammonium compounds, alkyl amines, ethoxylated or propoxylated compounds, and glycerol compound, which are either applied to the surface of the liner or incorporated directly into the plastic used to form the liner. An inherent disadvantage of surface treatments is that they are quickly and easily removed and care must be taken to ensure that they are applied to the entire surface. Incorporating conventional antistatic chemicals directly into the plastic composition used to form the liner also has certain disadvantages. Specifically, antistatic chemicals incorporated into the polymeric plastic composition are intended to continually migrate to the surface and form a static dissipative film thereon. Accordingly, the antistatic additives must exhibit a relatively specific degree of compatibility and mobility in the polymeric composition to migrate to the surface in the desired manner. As a consequence, the amount of antistatic additive which must be added to achieve the desired static dissipative properties is generally critical over a narrow range. This is particularly true for polyolefin compositions, which are presently preferred for use in fabricating the liners because of their excellent chemical resistance and ability to effectively retard diffusion or permeation of the various components contained in a variety of flammable liquid or semi-liquid compositions. Another related disadvantage arises from the fact that subsequent exposure to even moderately high temperatures, after the antistatic chemical additive has been incorporated into the polymeric composition which is used to form the liner, will tend to cause excessive blooming of the antistatic additive from the plastic, which can result in a significant or total loss of static dissipative properties. Such exposure to heat can occur, for example, during thermoforming operations during fabrication of the liner.

A primary object of the invention is to provide a suitable container liner which will serve as an effective barrier for preventing contact between the walls of a metal container and a flammable liquid or semi-liquid composition contained therein, which will permanently achieve the desired static dissipative properties irrespective of exposure to moderately elevated temperatures, and which does not rely on surface treatments which can be easily and inadvertently removed.

SUMMARY OF THE INVENTION

The invention provides a static dissipative, chemical resistant container liner for facilitating reuse of the container without the need for extensive cleaning, inspection or repair thereof. The liner is made of a rigid plastic material with electrically conductive carbon black dispersed therein in an amount sufficient to import suitable static dissipative properties for containing flammable liquid or semi-liquid compositions such as various coating and adhesive formulations. Because the static dissipative properties are achieved by the distribution of electrically conductive carbon black particles in a polymeric system, rather than by using conventional organic antistatic agents which are either applied to the surface of the liner, or incorporated into the polymeric material forming the liner so that they will migrate to the surface to form a static dissipative film, the desired static dissipative properties are generally permanent irrespective of subsequent processing, exposure to heat, and inadvertent removal of the surface treatment or film. An additional advantage of the invention is that the desired static dissipative properties are more easily achieved and are not highly sensitive to the particular amount or type of electrically conductive carbon black which is utilized, whereas for known liners both the amount and type of organic antistatic agent is critical to achieving the desired static dissipative properties.

BRIEF DESCRIPTION OF THE DRAWING

The drawing FIGURE shows a perspective view of a static dissipative, chemical resistant container liner in accordance with the invention, and which has been partially withdrawn or removed from a metal container for which the liner is designed to protect.

DESCRIPTION OF THE PREFERRED EMBODIMENTS

A static dissipative, chemical resistant container liner 10 in accordance with the principles of 10 has a generally cylinder-shape body 12 which is open at the top and which has an integral bottom (not shown). The liner 10 typically includes a flange, rim or lip 14 which generally circumscribes the opening at the top of the cylinder-shape body 12. The lip 14 generally conforms in shape to, and nests with, a corresponding lip 16 of a metal container 18 which is to be protected by the liner 10. The container 18 is closed and sealed with a conventional lid (not shown) and any of various conventional sealing means, such that the lip 14 of the liner 10 is sealingly interposed between the lip 16 of the container and the lid, to prevent liquid materials contained within the liner 10 from overflowing and running along the very narrow annual region between the container 18 and the liner 10 if the sealed container is tipped.

The invention is not limited to containers of any particular size or shape, but is primarily intended to be used with generally conventional type cylindrical containers such as metal pails, drums or barrels having a capacity of from about 5 gallons to about 55 gallons. The liner 10 is generally dimensioned so that it fits snugly within the metal container 18 which it is intended to protect.

The polymeric system used for forming the liner 10 of the invention can generally comprise any polymer or blend of polymers having suitable diffusion or permeation resistance and chemical resistance to the components comprising the particular composition which is to be contained, and which can be imbued with the described static dissipative properties by distributing electrically conductive carbon black therein. The polymeric composition should preferably be relatively rigid. For example, the polymeric composition desirably has a modulus which is sufficiently high to allow the liner to retain its shape in a free standing position unsupported by the metal containers. The polymeric material should preferably exhibit the desired chemical resistance (i.e., resistance to chemical reaction, solvent absorption and swelling, and diffusion or permeation resistance) needed to prevent contact between the walls of the metal container and the liquid material contained therein when formed into a container liner 10 having relatively thin walls such as from about 5 to 20 mils (0.005" to 0.020").

Suitable polymers for use with the invention include generally any of various polymers having the desired properties. Specific examples include thermoplastic resins such as low, medium, high density, and ultrahigh molecular weight polyethylene, linear low density polyethylene, polypropylene, ethylene-propylene copolymer, ethylene-vinyl acetate copolymer, ethylene-acrylic acid ester copolymer, polyamide resin, polyester resin, polycarbonate, polyvinyl chloride, polyvinylidene chloride, chlorinated polyvinyl chloride, polyvinyl acetate, polyacetal resin and the like, as well as blends thereof. Preferred polymers include polyethylene, most preferably high density polyethylene, and copolymers of ethylene and a polar copolymer such as acrylic acid or vinyl acetate.

Suitable conductive carbon blacks for use with the invention generally includes any of the well known conductive carbon blacks which are obtained from the incomplete combustion of hydrocarbon vapors, and include acetylene blacks, channel blacks, and furnace blacks. The conductive carbon blacks which are suitable for use with the invention generally have a weight average equivalence spherical particle diameter of from about 5 to about 500 nanometers. The equivalence spherical particle diameter of a given particle is the diameter of a sphere having the same volume. The conductive carbon blacks which are suitable for use with the invention generally have a bulk density of from about 22 to about 32 pounds/cubic foot, and a surface area as determined by BET isotherm absorption of from about 100 to about 300, and more preferably from about 150 to 250, square meters per gram. It is imperative that the conductive carbon black be thoroughly dispensed, and is in complete contact with the polymer matrix on a molecular level.

The amount of carbon black utilized in the composition should be sufficient to achieve a surface resistivity of from about $10^5$ to about $10^{11}$ ohms/square as determined by ASTM D-257 procedure, and to achieve a static decay of less than 0.5 seconds @10% cutoff for static decay, as determined by Federal Test Method Standard 101C, Method 4046. The actual amount of carbon black needed to achieve the above static dissipative requirements depends on the particular conductive carbon black used and on the particular polymers used in the composition. However, if the static dissipative requirements can generally be met by utilizing a relatively broad range of conductive carbon black content. In general, suitable results can be achieved by utilizing from about 5 parts to about 100 parts by weight of conductive carbon black for every 100 parts by weight of polymer, and more preferably from about 15 to about 50 parts by weight of conductive carbon black per 100 parts by weight of polymer. Actual pail liners prepared in accordance with the invention have exhibited a surface resistivity of from about $1.5 \times 10^4$ to $1.3 \times 10^8$, and a static decay of less than 0.3 seconds.

The polymeric compositions used to form the liners of the present invention may further contain additives such as antioxidants, heat-resistant stabilizers, lubricants, flame retardants, pigments, plasticizers, UV-ray absorbers etc., which are conventionally used in thermoplastic resins.

The compositions of the present invention can be prepared according to any known method, but preferably are molded into pellets by mixing and kneading uniformly in a conventional manner by a suitable blender such as a kneader, Banbury mixer, mixing rolls, pressure kneader, etc. The pellets can then be molded, calendered, or extruded into sheets which can be thermoformed into a liner in accordance with the invention.

EXAMPLES

The static dissipative properties of a pail liner in accordance with the invention was compared with those of an untreated polyethylene liner and with a commercially available static dissipative liner having an anti-static coating. The results are summarized in the Table.

TABLE

| Liner Type | Surface Resistivity (Ohm/Square) | Static Decay (Sec.) |
| --- | --- | --- |
| Untreated (commercial Product) | >$10^{15}$ | * |
| Anti-Static Coating (Commercial Product) | $1.5 \times 10^{13} - 1.0 \times 10^{15}$ | * |
| Conductive Carbon Black (Invention) | $1.5 \times 10^{4} - 1.3 \times 10^{8}$ | <0.3 |

*Undeterminable using Federal Test Method Standard 101c, Method 4046 due to inadequate electro-conductive properties.

The results indicated that the invention achieved good static dissipative properties, whereas the commercially available static dissipative pail liners do not meet the static dissipative criteria of the National Fire Protection Association.

While in accordance with the patent statutes the best mode and preferred embodiment has been set forth, the scope of the invention is not limited thereto, but rather by the scope of the attached claims.

What is claimed is:

1. A chemical-resistant container liner, comprising:
a homogeneous blend of from about 5 parts to about 100 parts by weight of conductive carbon black having a surface area as determined by BET isotherm absorption of from about 100 to about 300 square meters per gram with 100 parts by weight of polyethylene; said polyethylene having a sufficiently high modulus to allow the liner to retain its shape in a free-standing position and wherein the carbon black is in complete contact on the molecular level with said polyethylene; said liner being a cylinder and having a surface resistivity of from about $1 \times 10^5$ to about $1 \times 10^{11}$ ohms/square as determined by ASTM D-257 "Surface Resistivities" procedure and a static decay of less than 0.5 seconds at 10 percent cut-off for static decay as determined by Federal Test method Standard 101C Method 4046.

2. A liner as set forth in claim 1, wherein said cylinder has a cylindrical wall of from about 5 to about 20 mils and an integral bottom.

3. A liner as set forth in claim 2, wherein said cylinder includes a radially outwardly extending flange distal to said bottom.

4. A method of making a removable static dissipative liner for a cylindrical container, comprising the steps of:
forming pellets from a blend of a polymer matrix and from about 15 to about 50 parts per hundred of the matrix polymer of conductive carbon black wherein the carbon black is in complete contact on the molecular level with said matrix, said polymer matrix comprising polyethylene and optionally further comprising polymer additives;

forming a sheet from said pellets; and forming a self-supporting cylindrical liner by thermoforming said sheet, said liner having a cylindrical wall of from about 5 to about 20 mils and an integral bottom, said cylindrical wall and said liner having a surface resistivity of from about $1 \times 10^5$ to about $1 \times 10^{11}$ ohms/square as determined by ASTM D-257 "Surface Resistivities" procedure and a static decay of less than 0.5 seconds @ 10 percent cut-off for static decay as determined by Federal Test Method Standard 101C, Method 4046.

5. A method as set forth in claim 4, wherein said conductive carbon black has a surface area as determined by BET isotherm absorption of from about 100 to about 300 square meters per gram.

6. A method as set forth in claim 4, wherein said forming step includes forming a radially outwardly extending flange distal to said cylinder bottom.

7. The liner of claim 1, wherein said thermoplastic resin is high density polyethylene.

8. The liner of claim 7, wherein said surface resistivity is from about $1.5 \times 10^4$ to about $1.3 \times 10^8$ ohms/square and said static decay is less than 0.3 seconds.

9. The method of claim 4, wherein said surface resistivity is from about $1.5 \times 10^4$ to about $1.3 \times 10^8$ ohms/square and said static decay is less than 0.3 seconds.

10. A method as set forth in claim 4, wherein said polyethylene is high-density polyethylene.

* * * * *

UNITED STATES PATENT AND TRADEMARK OFFICE
CERTIFICATE OF CORRECTION

PATENT NO. : 5,514,299
DATED : 5/7/96
INVENTOR(S) : Joseph J. Kalwara

It is certified that error appears in the above-indentified patent and that said Letters Patent is hereby corrected as shown below:

Column 5, line 43:

A chemical-resistant container liner," should read

A removable chemical-resistant container liner,--.

Signed and Sealed this

Eighteenth Day of February, 1997

*Attest:*

BRUCE LEHMAN

*Attesting Officer*      *Commissioner of Patents and Trademarks*